Aug. 7, 1923.  
F. R. HARRISON  
1,464,267  
CHAIN LINK CONSTRUCTION  
Filed May 15, 1922  2 Sheets-Sheet 1
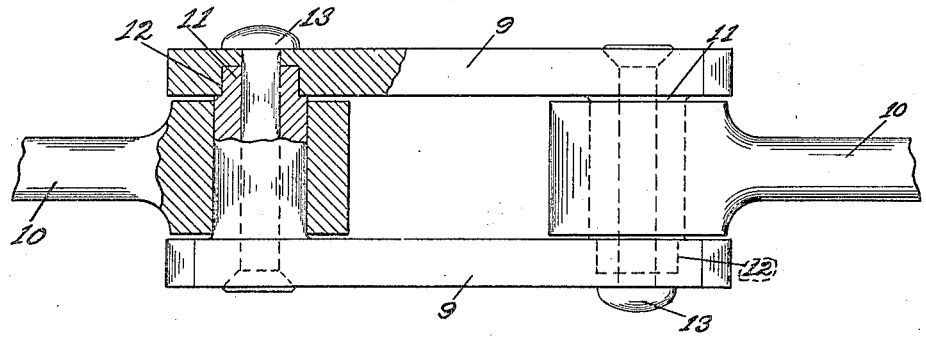
Fig-1-
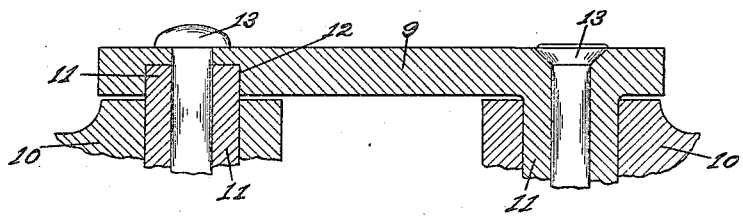
Fig-2-
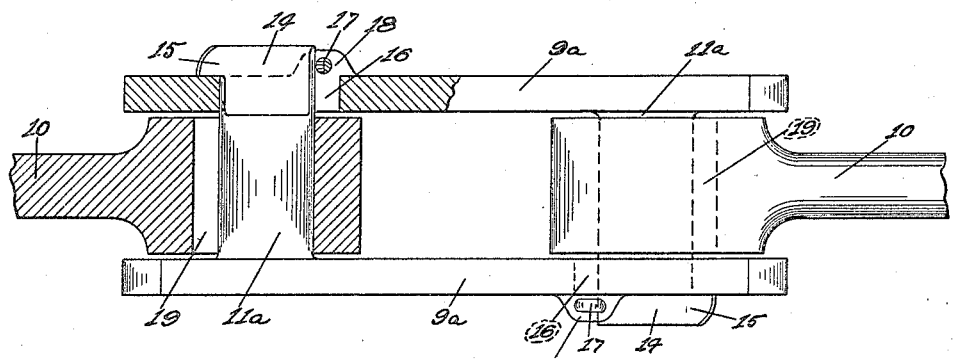
Fig-3-
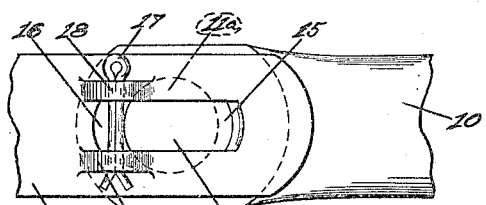
Fig-4-
Inventor  
FREDERICK R HARRISON  
By A. E. Carlsen  
Attorney Aug. 7, 1923.
F. R. HARRISON
CHAIN LINK CONSTRUCTION
Filed May 15, 1922     2 Sheets-Sheet 2
1,464,267
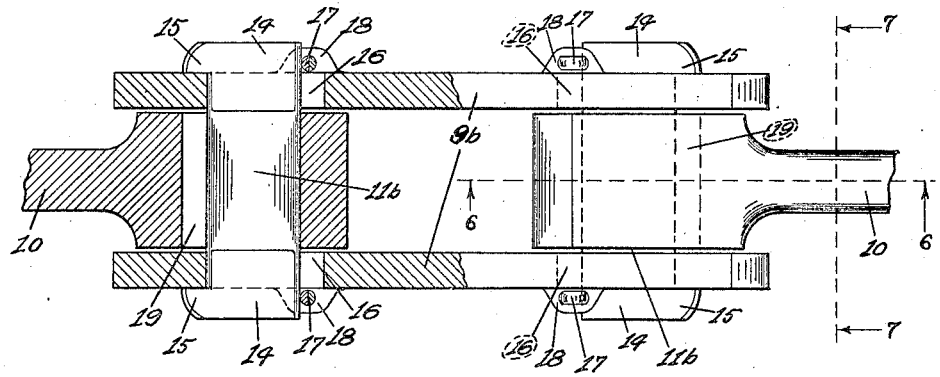
Fig_5_
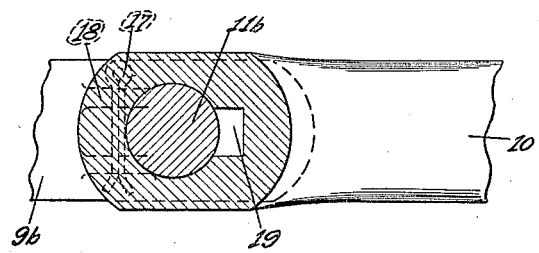
Fig_6_
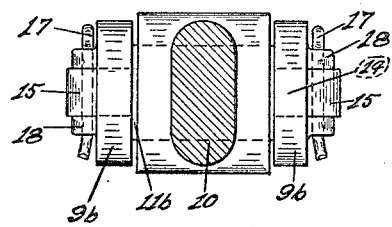
Fig_7_
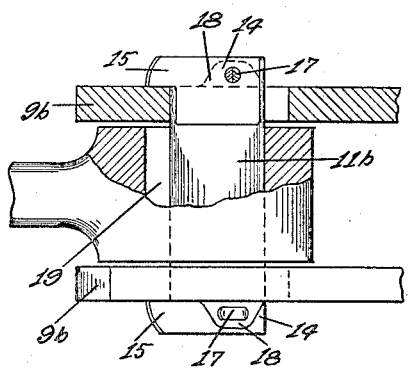
Fig_8_
Inventor
FREDERICK R HARRISON
By A. E. Carlsen
Attorney Patented Aug. 7, 1923.

1,464,267

UNITED STATES PATENT OFFICE.

FREDERICK R. HARRISON, OF MINNEAPOLIS, MINNESOTA.

CHAIN-LINK CONSTRUCTION.

Application filed May 15, 1922. Serial No. 561,202.

*To all whom it may concern:*

Be it known that I, FREDERICK R. HARRISON, a citizen of the United States, residing at Minneapolis, in the county of Hennepin and State of Minnesota, have invented certain new and useful Improvements in Chain-Link Constructions, of which the following is a specification.

This invention relates to chain link constructions, and the main object is to provide an improved, practical and efficient type of chain link which is particularly adaptable for use in connection with large and heavy duty chains. Further objects will be disclosed in the course of the following specification, particularly pointed out in the claims appended hereto, and clearly illustrated in the accompanying drawings wherein:

Fig. 1 is an elevation of a chain link embodying a preferred form of the invention; fractional portions being broken away for illustration purposes.

Fig. 2 is a sectional detail view of one side of a link, the same illustrating a slight modification of the construction shown in Fig. 1.

Fig. 3 shows a further modification of the link construction.

Fig. 4 is a fractional detail side view of the right end portion of the link shown in Fig. 3.

Fig. 5 illustrates a modification of the link construction shown in Fig. 3.

Fig. 6 is a sectional detail view on the line 6—6 in Fig. 5.

Fig 7 is an end view of the link shown in Fig. 5 and on the line 7—7 in the figure, and, Fig. 8 illustrates a modification of side bar which may be used with the constructions shown in Figs. 3 to 7, inclusive.

Referring to the drawings, by reference characters, and particularly to Figs 1 and 2 for the moment, 9 designates the side plates of a chain link to each end of which is connected a link bar 10. One end of each of the side plates 9 is provided with an integrally formed bushing or trunnion member 11, and the opposite ends of the plates 9 are provided with recesses adapted to seat the end of the adjacent bushing member 11, as at 12. The ends of the bushings 11 may be straight, as in Fig. 2, or they may be reduced in size, as shown in Fig. 1. The link bars 10 are rotatably carried on the members 11, and, when thus assembled, all the parts are secured together by pins (rivets or bolts) 13, which extend through the members 11 and the side plates 9. In this construction it will be obvious that the main link will be very rigid and strong, while the links 10, by being carried on the bushings 11, will not wear directly on the pins, thus weakening the main links of the chain.

In Figs. 3 and 4, the trunnion members 11ª, instead of being secured by pins to the side plates 9ª are provided with flattened end portions 14, having lugs 15, which engage in slots 16, so that the two link sections can be hooked and interlocked together. Cotter pins 17, or the like, are inserted in ears 18 on the outer sides of the side plates, so that the members 14 cannot disengage from the slots 16. It is necessary, in this type of link, to provide the link bar end apertures with channels 19 so that the lugs 15 can be passed through said apertures together with the trunnion members 11ª.

In the link construction illustrated in Figs. 5, 6, 7 and 8, the side plates 9ᵇ are each provided with two end slots 16 and the trunnions members 11ᵇ, which are detachable from the side plates, are flattened and provided at both ends with lugs 15. In Fig. 8 a further modification in the member 11ᵇ is shown in that the flattened end portions 14 rest between the ears 18, and the cotter pin 17 engage in apertures in both the ears and the said end portions.

It is understood that further modifications may be made in the general design and structural details of this invention, provided, however, that such modifications come within the spirit and scope of the appended claims. Having now therefore fully shown and described my invention, what I claim is:

1. A chain link comprising a pair of side plates, trunnion members connecting said plates at the ends of the link, each of said members being rigidly formed at one end with one of the side plates and having its other end flattened and provided with a lug arranged longitudinally with respect to and for engagement with the opposite plate, and means for removably securing said flattened trunnion ends in said opposite side plates consisting of pins arranged on the side of the plate for engagement against said trunnion ends.

2. A chain link comprising a pair of side plates, trunnion members connecting said side plates at the ends of the link, each of said trunnion members being rigidly secured at one end to one plate and extending through an aperture in the other plate with its other end, an integrally formed lug on the last mentioned end of each trunnion for locking the same with the adjacent side plate, and detachable means consisting of removable pins on the plates for detachably retaining said lugs in interlocking positions.

3. A chain link comprising a pair of side plates, trunnion members connecting said side plates at the ends of the link, each of said trunnion members being rigidly secured at one end to one plate and extending through an aperture in the other plate with its other end, so as to interlock therewith, a pair of ears on the outer side of each plate, and a removable pin in each pair of said ears, said pins being adapted to detachably secure said trunnion members in said interlocking positions.

4. A chain link comprising side plates and trunnion members connecting the ends thereof, said side plates each having a slot adapted to be engaged by one end of a trunnion member, which extends therethrough, and which is provided with a lug adapted to engage against said side plate, ears formed on the side plates adjacent said slots, and pins detachably secured in said ears, said pins being adapted to engage the portions of the trunnion members extending through the slots.

5. In a chain link having side plates and trunnion members connecting the end thereof, means for connecting one end of a trunnion member to one end of a side plate consisting of providing the latter with a longitudinal slot and integral ears at each side thereof, said trunnion end being flattened for engagement with the slot and having a lug at one side for interlocking engagement with the adjacent plate portion, and a pin extending through said ears for retaining said interlocking engagement of the lug with the side plate.

In testimony whereof I affix my signature.

FREDERICK R. HARRISON.